United States Patent [19]

Schiffner

[11] Patent Number: 5,075,793
[45] Date of Patent: Dec. 24, 1991

[54] APPARATUS FOR DETECTING INTENSITY-MODULATED LIGHT SIGNALS

[75] Inventor: Gerhard Schiffner, Wetter, Fed. Rep. of Germany

[73] Assignee: Siemens Aktiengesellschaft, Munich, Fed. Rep. of Germany

[21] Appl. No.: 227,292

[22] Filed: Aug. 2, 1988

[30] Foreign Application Priority Data

Aug. 4, 1987 [DE] Fed. Rep. of Germany ....... 3725827

[51] Int. Cl.$^5$ .................................. H04B 10/00
[52] U.S. Cl. .................................... 359/190
[58] Field of Search .................. 455/619, 606, 607

[56] References Cited

U.S. PATENT DOCUMENTS

| 4,718,121 | 1/1988 | Epworth | 455/619 |
|---|---|---|---|
| 4,732,447 | 3/1988 | Wright | 455/619 |
| 4,769,853 | 9/1988 | Goodwin | 455/616 |
| 4,783,852 | 11/1988 | Auracher | 455/619 |
| 4,805,236 | 2/1989 | Urala | 455/619 |
| 4,856,094 | 8/1989 | Heidrich | 455/619 |

FOREIGN PATENT DOCUMENTS

| 0194786 | 9/1986 | European Pat. Off. | |
| 3150697 | 7/1983 | Fed. Rep. of Germany | 455/619 |
| 3630619 | 9/1986 | Fed. Rep. of Germany | 455/619 |
| 0052135 | 3/1985 | Japan | 455/609 |
| 0298241 | 12/1987 | Japan | 455/619 |

OTHER PUBLICATIONS

Auracher, "Entwicklungstendenzen, Der Integrierten Optics" Telcom. Report 10 (1987) Heft 2, pp. 90–98.
Kingsley, "Fiber Optic Microphones and Hydraphones: A Comparison with Conventional Devices", 1978 International Optical Computing Conference, pp. 67–74.
Hodgkinson, "Demodulation of Optical Disk Using in Phase and Quadrature Detection".
Maylon et al., "Semiconductor Laser . . . Phase–Locked Loop", Electronics Letters, vol. 22, No. 8, 1986, pp. 421–422.
Kazovsky L., "Balanced Phase–Locked Loops . . . Linewidth Requirements", J. Lightwave Tech., vol. Lt-4, No. 2, 1986, pp. 182–195.
Booth R. C., "Integrated Optic Devices for Coherent Transmission", ECOC '85, pp. 89–96.
Davis et al., "Phase Diversity . . . Receivers", J. Lightwave Tech. vol. LT-5, No. 4, 1987, pp. 561–572.

Primary Examiner—Curtis Kuntz
Assistant Examiner—Leslie Pascal
Attorney, Agent, or Firm—Hill, Van Santen, Steadman & Simpson

[57] ABSTRACT

An apparatus for detecting intensity-modulated light signals is provided that exhibits higher sensitivity in comparison to prior apparatus and which is composed of an optical detector for detecting an intensity-modulated optical signal and a mixer stage in the form of an electronic mixing device having a subsequent lock-in amplifier. The mixer stage comprises an optical mixing device into which the optical signal can be coupled and from which the mixed signal can be taken as an optical signal and the mixed signal is fed to an optical detector device.

7 Claims, 4 Drawing Sheets

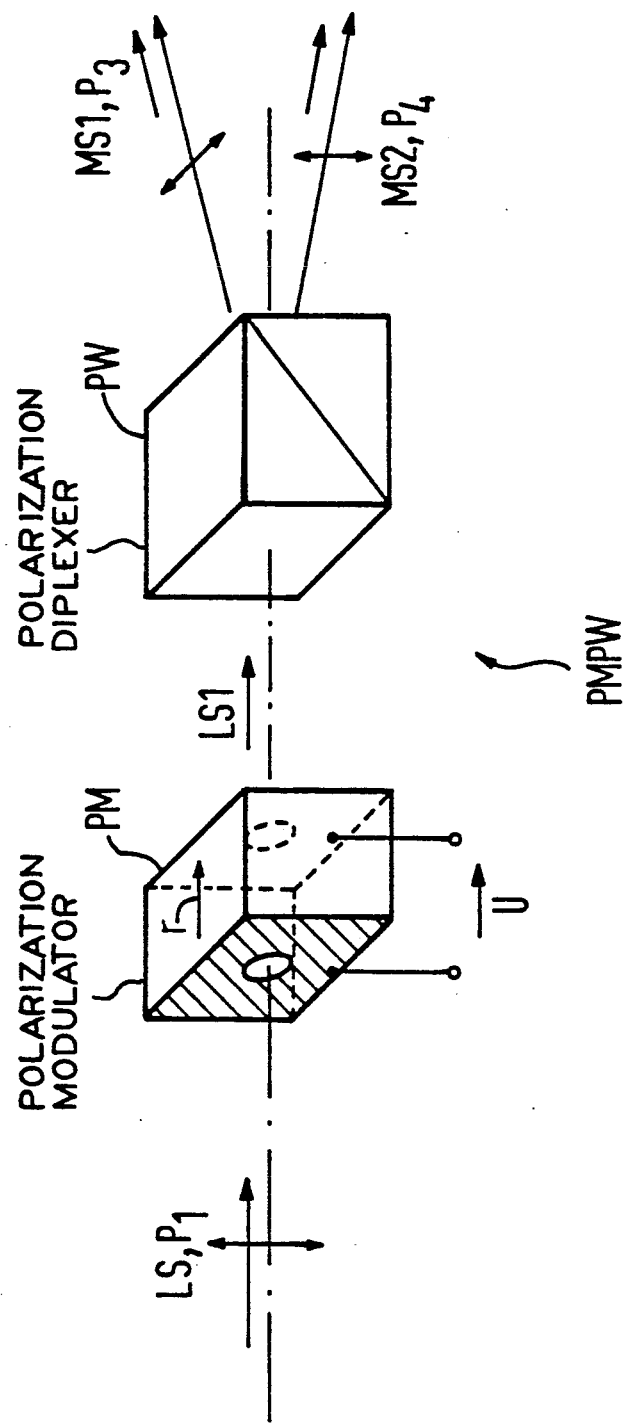

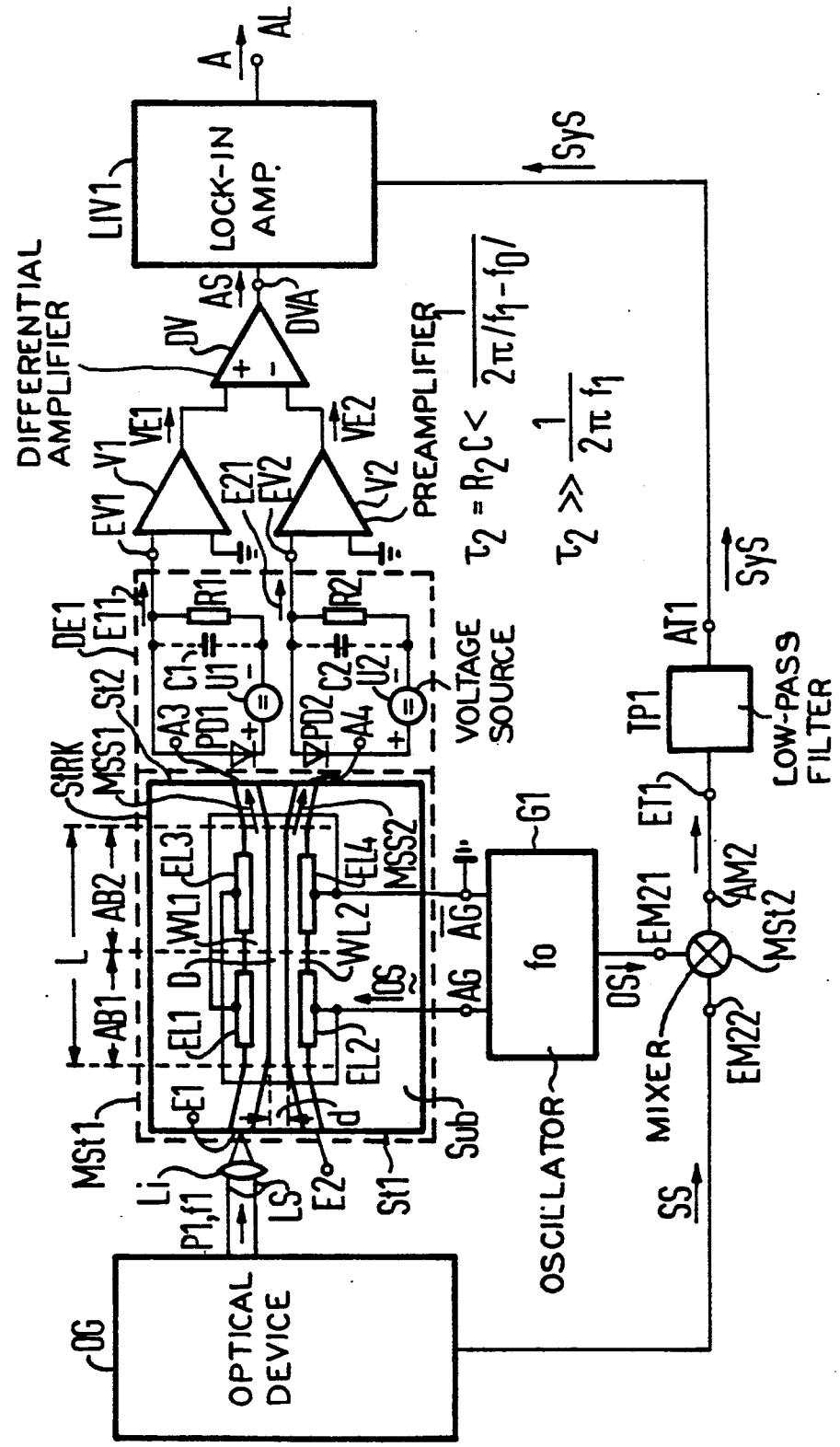

APPARATUS FOR DETECTING INTENSITY-MODULATED LIGHT SIGNALS

BACKGROUND OF THE INVENTION

1. Field of the Invention:

The present invention relates to an apparatus for detecting intensity-modulated light signals which is composed of an optical detector comprising an optical electrical detector for the conversion of light intensity into corresponding, electrical power and comprising a load resistor connected to the detector, and composing a mixture stage into which a signal corresponding to the modulated intensity of the light signals to be detected and into which another signal synchronized with that signal and having a frequency defined by a modulation frequency of the one signal can be coupled, and from which a mixed signal formed of the one signal and of the other signal can be taken.

2. Description of the Prior Art

A frequent case in modern optics is that a light beam from the visible, the infrared or the ultraviolet range, that is intensity-modulated with a periodic oscillation, for example with a sinusoidal or square-wave oscillation, must be detected. This radiation can freely propagate or, on the other hand, can also be guided in a light waveguide. The concern is therefore to obtain a signal that is proportional to the amplitude of the intensity of fluctuation of the fundamental or, on the other hand, of a harmonic as well. A relatively small bandwidth is usually adequate for this signal, for example on the order of magnitude of 1 Hz. The frequency of the periodic oscillation usually lies on the order of magnitude of between 10 Hz and many MHz. The problem is to make the apparatus as sensitive as possible, i.e. the output signal proportional to the intensity fluctuation should contain, optimally, little noise, even given an extremely weak light signal.

The aforementioned problem occurs, for example, in fiber ring interferometers or ring resonators that are utilized as rotation sensors and also occurs in apparatus for documentation of absorption spectra, for example when measuring the attenuation of light wave guide links. Modulated light is frequently used for easier detectability.

The aforementioned problem has heretofore been solved in the following manner. The intensity-modulated light signal to be detected is fed to an optical detector device comprising an optical-electrical detector for converting light intensity into corresponding power and comprising a load resistor connected to the detector. The electrical signal circuit and a pre-amplifier must thereby have a great bandwidth such that the periodic oscillation impressed on the light beam can still be well amplified free of distortion. Subsequently, the electrical signal is supplied to a lock-in amplifier that contains a mixer or a multiplying stage and a low-pass filter, for example in the form of an integrator.

In addition to receiving the one electrical signal, the electrical mixer stage also receives another electrical signal that is supplied by an electronic oscillator and a fluctuating signal quantity oscillates corresponding to the frequency and phase of the intensity of the one signal that is modulated and to be detected. This is usually achieved by external synchronization.

A mixed signal formed of the one electrical signal and of the other electrical signal can be taken at an output of the mixer stage and the mixed signal, after filtering in the low-pass filter or integrator, corresponds to the amplitude of the modulated intensity or intensity fluctuation. The signal-to-noise ratio thereby becomes all the greater the longer the integration time.

SUMMARY OF THE INVENTION

The object of the invention, therefore, is to provide an apparatus of the type set forth above that exhibits greater sensitivity in comparison to the apparatus heretofore known.

The above object is achieved in an apparatus of the type set forth which is particularly characterized in that the mixer stage comprises an optimal mixer into which the one signal can be coupled as a light signal and from which the mixed signal can be taken as a light signal and in which the mixed signal is fed to the opto-electrical detector.

In accordance with the present invention, it is critical in the apparatus that the intensity-modulated light signal is already mixed with or multiplied by the other signal before the detection in the detector and is only subsequently converted into an electrical signal by the opto-electrical detector. A significant advantage of the apparatus of the present invention is that the electrical circuit connected to the opto-electrical detector and containing the load resistor need only exhibit a low temporal resolution and extremely large load resistors can therefore be used, the sensitivity of the apparatus being capable of being significantly increased therewith.

The present invention is based on the known fact that, with a given electrical signal with, the signal-to-noise ratio of an opto-electrical detector is proportional to the size of the load resistor. Given the traditional apparatus, however, the load resistor cannot be selected arbitrarily high because of the finite capacitances in the electrical circuit, this covering the self-capacitance of the opto-electrical detector, stray capacitances and an input capacitance of a pre-amplifier. The time constant of the parallel circuit of a load resistor and a resulting capacitance should be shorter than the period duration of the oscillation modulated onto the light beam. The capacitance plays a subordinate role given utilization of transimpedance amplifiers or current-to-voltage converters; however, the set noise of the pre-amplifier limits the sensitivity. An arrangement having a high load resistor and a following pre-amplifier having a high input impedance supplies better results given low signal bandwidths.

The aforementioned advantage of the apparatus constructed in accordance with the present invention is to be understood such that the load resistor in the apparatus can have an extremely higher value than the load resistor in the aforementioned, previous apparatus, whereby this is also particularly valid when both apparatus are designed for the same bandwidth.

In addition to the above, it should be pointed out that a lock-in amplifier, as essentially represented by the oscillator, the mixer and the low-pass filter of the integrator in the previous, above-described apparatus, accepts noise within a band having twice the bandwidth of the low-pass filter, by contrast, apparatus constructed in accordance with the present invention only accepts noise within a band that corresponds to once the bandwidth of the detectors that are identically constructed or can be identically constructed in both apparatus.

The relationship between the signal-to-noise ratio of the apparatus constructed in accordance with the present invention, compared to the signal-to-noise ratio of the aforementioned previous apparatus, is established by the relationship between twice the modulation frequency and the bandwidth. Since the modulation frequency lies in the MHz range and the bandwidth of the band can lie in the Hz range, this relationship between the signal-to-noise ratios clearly shows the great advantages that can be achieved with the apparatus of the present invention in comparison to traditional apparatus of the type set forth above.

A particular feature of the invention is characterized in that in addition to comprising an optical output at which the mixed signal can be obtained, the optical mixer comprises a second optical output at which a second mixed signal can be simultaneously obtained, whereby the sum of the intensities of the mixed signals at any point in time is equal to the intensity of the one signal at this point in time multiplied by a constant factor which is smaller than or equal to 1.

Another feature of the invention is characterized in that, in addition to the one opto-electrical detector, the optical detector device comprises a second opto-electrical detector for the conversion of light intensity into corresponding electrical power to which the second mix signal is fed and, in addition to the one load resistor, comprises a second load resistor that is connected to the second opto-electrical detector.

Another feature of the invention is characterized in that an electrical signal is taken at the one load resistor and is fed to a difference input (+ or −) of a differential amplifier and an electrical signal is taken at the other load resistor and is fed to another input of the differential amplifier, whereby the one signal and the other signal are taken such that their fluctuations have the same amplitude.

In apparatus constructed in accordance with the present invention, the intensity-modulated light signal itself can be input into the mixer stage. The frequency of the other signal can be equal to the modulation frequency of the intensity-modulated light signal, whereby both signals are preferably synchronized with one another.

The frequency of the other signal, however, need not necessarily coincide with the modulation frequency, but can differ therefrom. Such an apparatus then necessarily works with a beat signal impressed on the mixed signal, the frequency of the beat signal corresponding to the difference between the modulation signal and the frequency of the other signal. An apparatus constructed in accordance with the invention that can work with differential frequency is set forth below. This arrangement has the advantage that, given an appropriate selection of the difference between the modulation frequency and the frequency of the other signal, for example in the region of about 100 Hz, and even greater gain in the signal-to-noise ratio is obtained when the modulation frequency is significantly higher than 100 Hz, and that, in addition, a flicker noise that is unfavorable is reduced.

Another feature of the invention is characterized in that the lock-in amplifier accepts the output signal of the differential amplifier.

Another feature of the invention is particularly characterized in that an electronic mixer is provided for generating the synchronization signal and mixing the other signal, having the defined frequency, with an electrical signal corresponding in frequency and phase with the one signal, and in that a low-pass filter is provided that filters those frequencies which are higher than a predetermined amount of the difference between the modulation frequency and the defined frequency of an output signal of the electronic mixer, and in that the output signal of the low-pass filter is used as the synchronization signal.

Electro-optical modulators, particularly optical directional couplers or polarization modulators in combination with polarization diplexers, are suitable as optical mixers.

Accordingly, one feature of the invention is particularly characterized in that the optical mixer comprises an electro-optical modulator having an optical input for coupling in the optical signal and having one or two optical outputs for coupling out the one or the other mixed signal, this being at least chargeable with the other signal and modulating a defined, physical light parameter of the one signal coupled into the modulator according to an amplitude of the other signal.

Another feature of the invention is particularly characterized in that the electro-optical modulator is composed of a polarization modulator and of a polarization diplexer, whereby the polarization of the one signal coupled in as a polarized light signal is variable in the polarization modulator dependent on the other signal, and whereby the light signal coupled out of the polarization modulator and having the influenced polarization is fed to the polarization diplexer that splits this light signal into two separate signal components that are orthogonally polarized relative to one another, each of these signals being available to an opto-electrical detector as a mixed signal.

Apparatus constructed in accordance with the present invention can be utilized for sensitive detection of periodic intensity fluctuations of optical signals. For example, such signals occur in interferometer arrangements wherein, for example, a phase modulator driven with a periodic signal is contained. The fiber-optical rotation sensor is an example of such an interferometer.

Furthermore, an apparatus constructed in accordance with the present invention can also be utilized for the documentation of absorption spectra, particularly for measuring the attentuation curve in optical fibers or light waveguides, whereby intensity-modulated light, whose wavelength is varied over a range of interest, is used. The derivation of the absorption can be directly measured via the wavelength given utilization of light which is frequency modulated with the modulation frequency (conversion of frequency modulation into intensity modulation).

In particular, the apparatus constructed in accordance with the present invention can also be employed in optical communications technology. For light waveguide transmission links having intensity modulation, the apparatus can be utilized for synchronization of an electronic oscillator with the clock of digital, optical pulse groups. To this end, for example, a small portion of the incoming light power can be branched off for acquiring this clock. The arrangement of the present invention can also operate reliably given extremely long transmission links having high attenuation when the opto-electrical detector provided for the demodulation of the digital signals already comprises a low signal-to-noise ratio.

Given optical heterodyne reception, which covers heterodyne and homodyne reception, and will presumably be used for modern optical transmission systems, it should be noted that an intensity-modulated optical signal arises after superposition of the optical signal to be received with the signal of the local oscillator laser. Given application of phase-shift keying (PSK) an homodyne reception, for example, a signal arises that can be processed with the described apparatus of the present invention, being processed, for example, for clock acquisition.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 3 is a schematic representation of an optical mixer comprising an electro-optical modulator that is composed of a polarization modulator and of a polarization diplexer; and FIG. 4 is a schematic representation of an embodiment of the invention comprising an electro-optical modulator in the form of a controllable directional coupler, whereby the frequency of the second signal does not coincide with the modulation frequency.

DESCRIPTION OF THE PREFERRED EMBODIMENTS

Figure 1:
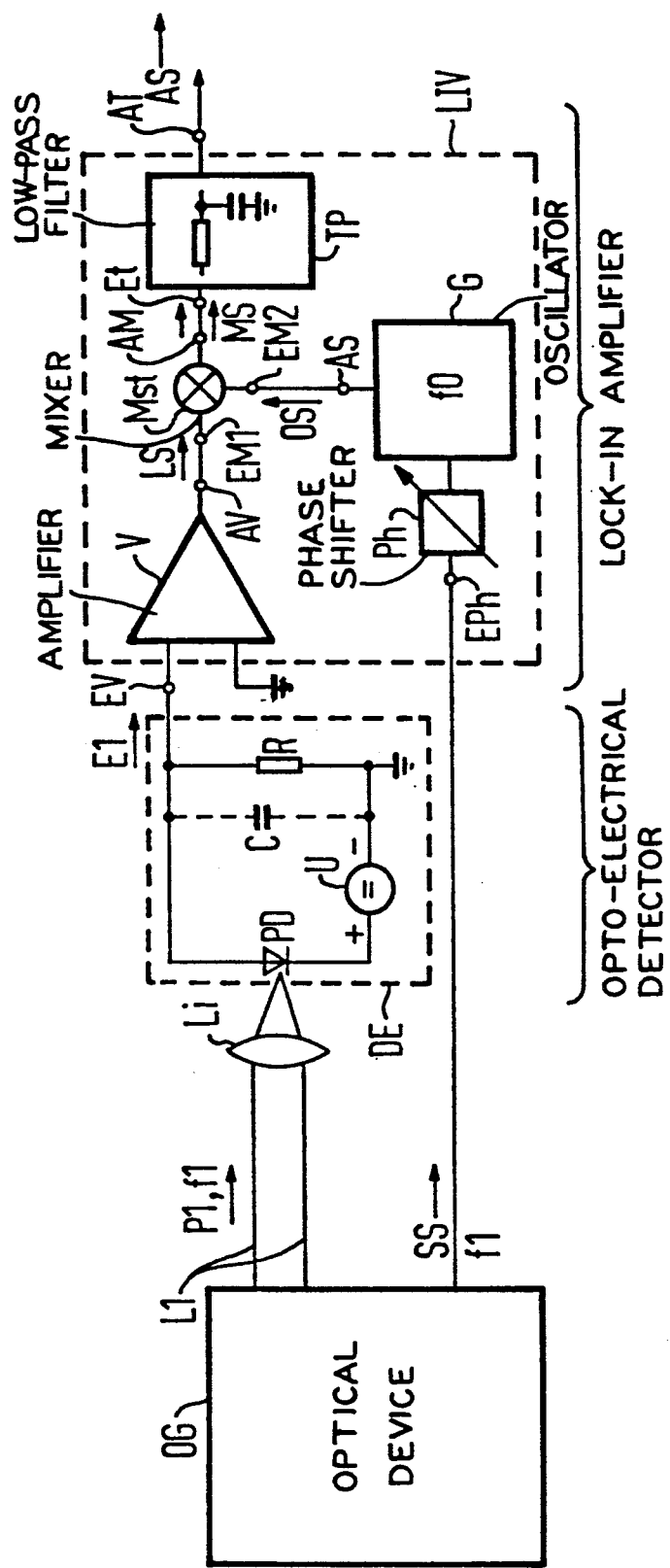
FIG. 1 is a schematic representation of a traditional apparatus in which the intensity-modulated light signal is directly connected to the optical detector, this being followed by a lock-in amplifier, and wherein the frequency of the second signal coincides with the modulation frequency of the intensity-modulated light signal.

In the traditional apparatus illustrated in FIG. 1, for example, an optical device OG outputs a light signal LI whose intensity PI is temporally varied and is modulated with a modulation frequency f1.

The light signal L1 impinges an opto-electrical detector PD of an optical detector device DE that, for example, can be a photodiode onto which the light signal L1 is focused by a lens Li.

The opto-electrical detector PD converts the amplitude-modulated and, therefore, intensity-modulated light signal L1 into a corresponding, modulated electrical signal E1 that is connected to an input EV of a preamplifier V of a lock-in amplifier LIV at its input.

An electrical circuit of the optical detector DE is shown in terms of its equivalent circuit diagram. The reference R therein indicates the load resistor of the diode that is connected parallel to the photodiode PD. The capacitance C that is connected parallel to the resistor R indicates the overall capacitance in the electrical circuit. A voltage source U is a constant voltage source that is connected into the electrical circuit, the constant voltage source U serving as a bias voltage source.

The load resistor R and the capacitance C are selected such that the time constant $\tau = R \cdot C$ defined by the product of its values is smaller than $\frac{1}{2}\pi \cdot f1$.

The electrical signal E1 fed to the preamplifier V is amplified in the amplifier V and is output at an output AV a the one electrical signal LS that corresponds to the intensity PI of the light signal L1 that is modulated and is to be detected.

The one signal LS is fed to an input EM1 of a mixer MSt in the form of an electronic mixer device into which the other signal OS, having the predetermined frequency f0, can be coupled via another input EM2. The mixed signal MS can be taken at an output AM of the mixer MSt The other electrical signal OS, having the predetermined frequency f0, is supplied by an electronic oscillator G. In the present case, the frequency and phase of the other signal OS coincide with the intensity-modulated oscillation that is to be detected, i.e. with the modulated intensity P1. This, for example, can be achieved by external synchronization. To this end, the frequency f0 of the oscillator G is selected identical to the modulation frequency f1 and a phase matching is carried out between the two signals having the frequency f0 and f1. This can occur in a known manner with a phase shifter Ph to which a signal that corresponds in frequency and phase with the one signal LS is supplied via an input EPh. After the phase matching, the other signal OS output the output AS of the oscillator G then also coincides in frequency and phase with the one signal LS. The mixed signal MS that can be taken at the output AM of the mixer MSt is fed to an input ET of a low-pass filter TP that has a defined bandwidth B.

The mixed signal MS is filtered in the low-pass filter TP, so that the amplitude of the low-pass filter, electrical output signal AS that can be taken at the output AT of the low-pass filter TP is proportional to the fluctuations of the intensity PI of the light signal L1.

Figure 2:
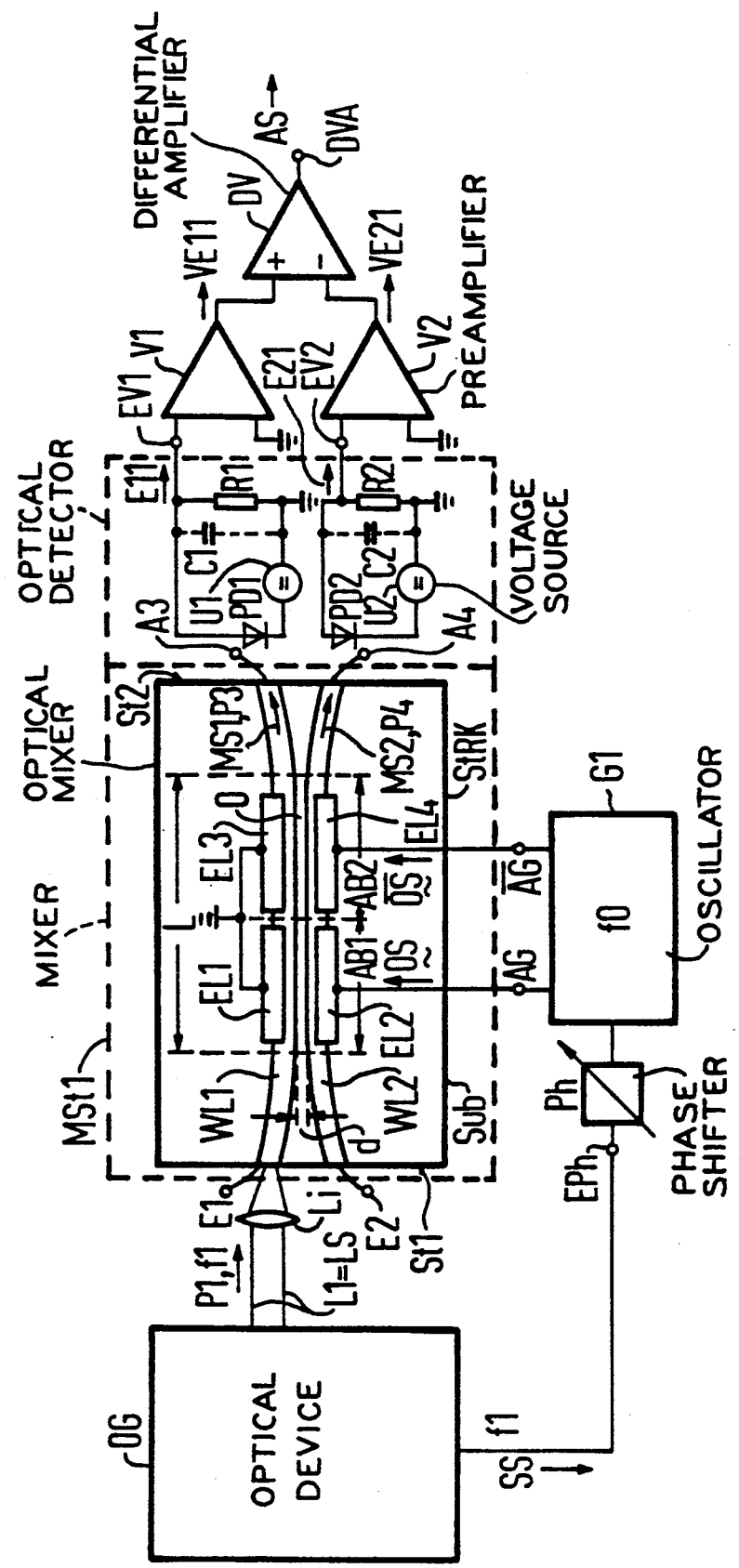
FIG. 2 is a schematic illustration of apparatus constructed in accordance with the present invention and comprising an optical mixer in the form of a controllable, optical directional coupler, whereby the frequency of the second signal likewise coincides with the modulation frequency of the intensity-modulated light signal.

Whereas the mixer stage MSt in the known apparatus of FIG. 1 is an electrical mixer stage that is charged with electrical signals and that also outputs an electrical mixed signal, the mixer stage MSt1 in the apparatus of FIG. 2 is composed of an optical mixer device StRK into which the light signal L1, whose intensity P1 is modulated with the modulation frequency f1, can be directly coupled as the one signal LS and from which the mixed signal MS1 and/or MS2 can be taken as a light signal. This optical mixed signal MS1 and/or MS2 is fed to the opto-electrical detector PD1 or, respectively, PD2 of the optical detector DE1.

In the apparatus illustrated in FIG. 2, the optical mixer StRK, for example, comprises an electro-optical modulator in the form of a controllable optical directional coupler whose degree of coupling can be controlled by the other signal OS.

For example, the optical directional coupler StRK of FIG. 2 comprises two optical strip waveguides WL1 and WL2 that are integrated on or in a substrate Sub of electro-optical material and are conducted parallel to one another within a coupling distance L at such a slight distance d from one another that the light guided in the one waveguide WL1 or WL2 can cross over onto the other waveguide WL2 or, respectively, WL1 in the coupling distance L. The four ends E1, E2, A3 and A4 of the two light waveguides WL1, WL2 that, for example, are located at the end faces St1 and St2 of the substrate Sub that face away from one another form four portions of the directional coupler StRK by way of which light can be respectively coupled in and/or coupled out.

Given the apparatus of FIG. 2, for example, the upper, left-hand portion E1 is used as an optical input for coupling the one signal LS into the waveguide WL1.

The left-hand lower portion E2 remains unused, i.e. light is neither coupled in nor coupled out of this portion. This can be effected by blocking this portion E2 with a light-impermeable and/or light-absorbing layer that is applied to the appertaining end face St1 of the substrate. The right-hand, upper portion E3 and the right-hand, lower portion A4 are each used for coupling light out of the directional coupler StRK.

The degree of coupling can be influenced by generating an electrical field in the material of the waveguide by way of the electrodes EL1–EL4 arranged in the coupling distance L. This occurs by way of the control of the propagation constants of the waveguides via the electro-optical effect (influencing the refractive indices). When the propagation constants coincide, then a high crossover can be obtained; when the propagation constants deviate greatly from one another, then the crossover into the other waveguide is low. The coupler is illustrated in FIG. 2 and is referenced as a $\Delta\beta$-reversing coupler in the literature ($\Delta\beta$ is the difference between the propagation constants of the two waveguides). By applying a temporally fluctuating electrical voltage to the electrodes, a temporally fluctuating, electrical field arises in the waveguides and a temporally fluctuating degree of coupling arises as a result thereof. When this fluctuating degree of coupling coincides in frequency and phase with the other signal OS and the light signal L1 is coupled into the waveguide WL1 via the optical input E1, for example with the assistance of a lens Li, the directional coupler StRK can form an optical mixer MSt1 that can assume the function of an electrical mixer as contained in the traditional apparatus of FIG. 1.

Basically, any optical modulator can be employed that comprises an input for coupling in the one signal LS and at least one output onto which the in-coupled, optical signal power P1 crosses over dependent on a signal value of the other signal OS and can be coupled out thereat, whereby the out-coupled signal power forms the mixed signal. Also basically useable is any such modulator that, in addition to the one optical output, comprises another optical output onto which the in-coupled signal crosses over dependent on a signal value of the other signal OS and can be coupled out thereat, whereby the signal power coupled out can also be used as a mixed signal. Such modulators, including the controllable directional coupler, can be defined with the assistance of the scattering matrix known from microwave engineering.

In practice, the modulation characteristic of such modulators is usually sinusoidal and, therefore, is overall non-linear. Given great level control, non-linearities lead to harmonic oscillations and combination oscillations that are contained in the out-coupled mixed signal. These harmonic oscillations and combination oscillations can be avoided when using modulators which have a linear modulation characteristic. This condition can also be met given non-linear modulation characteristics when level control is carried out in a range of characteristics in which the modulation characteristic is adequately linear.

Given a sinusoidal modulation characteristic, such a linear region is established with good approximation in the middle between a minimum and a maximum of this characteristic. Care must merely be exercised to see that the level control is made adequately small about this middle point.

Given the assumption that the modulation characteristic of the modulator is linear, that the one signal LS intensity-modulated with the modulation frequency f1 and, therefore, the controlling, other signal OS oscillating with the defined frequency f0 are each sinusoidal, whereby the degree of modulation of the other signal OS is less than or equal to 1, it can be demonstrated upon utilization of the scattering matrix, that, given an optical modulator comprising two optical outputs, for example, the optical directional coupler StRK comprising the two optical outputs A3 and A4, the light signals coupled out of the two optical outputs each comprise temporally fluctuating intensities P3 and P4 each of which contains the frequencies f0, f1, f1+f0 and f1−f0 whereby $$P3(t) + P4(t) = a \cdot P1(t)$$

applies for the intensities P1, P3 and P4 as functions of time, wherein a is smaller than or equal to 1. Given the assumption of a loss-free modulator, $a = 1$ applies.

Specific embodiments of the last-described, general optical modulator shall be set forth below. First of all, however, let the output side of the apparatus of FIG. 2 be discussed, whereby the general modulator comprising two optical outputs form the basis for this discussion.

The optical detector DE of FIG. 2 comprises an opto-electrical detector PD1 to which the signal power P3 (mixed signal MS1) coupled out from the optical output A3 is conducted, and also comprises another, for example, identical opto-electrical detector PD2 to which the signal power P4 (mixed signal MS2) coupled out of the other optical output A4 is conducted. Each of the two opto-electrical detectors PD1 and PD2 is arranged in an assigned, electrical circuit of the optical detector device DEI that is shown in terms of its equivalent circuit diagram. Each circuit comprises a load resistor R1 or, respectively, R2 connected in parallel to the assigned opto-electrical electrical detector PD1 or, respectively, PD2 and comprises a capacitor C1 or, respectively, C2 connected in parallel to the resistor, the capacitor identifying the overall capacitance in the appertaining electrical circuit. An assigned constant voltage source U1 or, respectively, U2 that serves as a bias voltage source is also connected into each circuit.

The load resistor R1 or, respectively, R2 and the capacitor C1 or, respectively, C2 are selected in each circuit such that the appertaining time constants $$\tau 1 = R1 \cdot C1 \text{ and } \tau 2 = R2 \cdot C2$$

are each very large compared to $\frac{1}{2} \cdot \pi f1$ and, therefore, in comparison to $\tau = R \cdot C$ of the previous apparatus as well.

The bandwidths B1 or, respectively, B2 of the two circuits are established by $$B1 = \tfrac{1}{2} \cdot \pi \cdot \tau 1 \text{ and } B2 = \tfrac{1}{2} \cdot \pi \cdot \tau 2.$$

Simplified conditions derive when $B1 = B2 = B$ is selected. This is assumed in the discussion below.

For estimating the advantage of the apparatus of FIG. 2 in comparison to the aforementioned, previous apparatus, the necessary size of the load resistor R shall first be estimated for the previous apparatus.

$$R = \tfrac{1}{2} \pi \cdot f1 \cdot C$$

holds true given an allowed drop-off of 3 dB. For the circuits of the apparatus of FIG. 2, a temporal resolution corresponding only to the bandwidth B is required; therefore, what holds true for the load resistor are the relationships $$R1 = \tfrac{1}{2} \cdot \pi \cdot B \cdot C1$$

$$R2 = \tfrac{1}{2} \cdot \pi \cdot B \cdot C2.$$

Since f1 is very large in comparison to the bandwidth B, it follows that the values of the resistors R1 and R2 are each respectively very large in comparison to the value R. This means that the apparatus of FIG. 2 has a significant sensitivity advantage over the apparatus of FIG. 1.

It must first be noted that a lock-in amplifier accepts noise within a bandwidth from f1−B through f1+B, i.e. within a band having the width 2·B where B indicates the bandwidth of the filter at the signal output. The arrangement of FIG. 2 accepts noise only within the band B which corresponds to the bandwidth of the two circuits. This is an additional advantage.

Given the assumption that R1=R2 and C1=C2 applies, the relationship between the signal-to-noise ratio (S/N)₁ of the apparatus of FIG. 2 and the signal-to-noise ratio (S/N) of the apparatus according to FIG. 1 amounts to $$(S/N)_1 / (S/N) = 2\, R1/R = 2\, f1/B.$$

Since f1 can lie in the MHz range and the bandwidth B can lie in the Hz range, one can anticipate an extremely great advantage given the apparatus of FIG. 2. The electrical signals E11 or, respectively, E21 taken at the load resistors R1 or, respectively, R2 of the apparatus of FIG. 2 are fed to inputs EV1 or, respectively, EV2 of assigned preamplifiers V1 or, respectively V2 and are each amplified in these amplifiers. The amplified electrical signals VE11 or, respectively, VE21 output by the amplifiers V1 and V2 are fed different inputs (the input+ and the input −) of a differential amplifier DV and whose output DVA the electrical output signal AS can be taken that is proportional to the amplitude of the intensity fluctuation of the one signal LS.

Two different embodiments of the optical mixer that can be used as a mixer stage MSt1 will be set forth below.

One embodiment of the optical mixer is composed of a controllable directional coupler StRK of the apparatus of FIG. 2 that has already been partly set forth above.

A pair of electrodes EL1, EL2 is arranged in a section AB1 of the coupling path L at the input side of this directional coupler StRK, this pair of electrodes being composed of an electrode EL1 assigned to the waveguide WL1 and a electrode EL2 assigned to the waveguide WL2.

A further pair of electrodes EL3 and EL4 is arranged in a section of a coupling path L at the output side, this electrode pair being composed of the electrode EL3 assigned to the waveguide WL1 and an electrode EL4 assigned to the waveguide WL2. The electrode pairs EL1, EL2 and EL3, EL4 serve the purpose of generating the chronologically-fluctuating, electrical field in the region of the waveguides WL1, WL2 from which the chronologically-fluctuating degree of coupling is the directional coupler StRK results.

Both of the pair of electrodes EL1, EL2 and EL3, EL4 are charged with the other signal OS having the defined frequency f0 such that one pair of electrodes generates one electrical field and the other pair of electrodes generates another electrical field that is directed opposite to the one electrical field.

For example, this can be achieved in that electrodes of the two pair of electrodes EL1, EL2 and EL3, EL4 assigned to the one waveguide, for example the electrodes EL1 and EL3 assigned to the waveguide WL1, are applied to ground and the electrodes EL2 and EL4 of the two pair of electrodes EL1, EL2 and EL3, EL4 that are assigned to the other waveguide WL2 are charged with the signal OS and that one of these two electrodes EL2 or EL4, for example the electrode EL2, is supplied with the signal OS and the other electrode EL4 is supplied with the negated, other signal $\overline{OS}$ that oscillates push-pull relative to the other signal OS. This possibility is used in the apparatus of FIG. 2.

Another possibility, for example, is that the electrode in one of the two pairs of electrodes EL1, EL2 and EL3, EL4 that is assigned to the one waveguide is applied to ground and that the electrode assigned to the other waveguide is charged with the other signal OS, whereas that electrode in the other electrode pair that is assigned to the other waveguide is applied to ground and that electrode assigned to the one waveguide is charged with the other signal OS. This possibility is realized in the apparatus of FIG. 4 that shall be set forth below.

In any case, the intensities of the electrical field is generated by the two pairs of electrodes EL1, EL2 and EL3, EL4 that are directed opposite to one another fluctuates synchronously with the signal OS and the degree of coupling of the directional coupler StRK also fluctuates correspondingly.

It is assumed, given the apparatus of FIG. 2 having the controllable directional coupler StRK that has just been set forth, as it is assumed in the apparatus of FIG. 1, that the defined frequency f0 of the signal OS is identical to the modulation frequency f1, so that f1−f0=0 is established.

As in the apparatus of FIG. 1, the electrical signal OS and the signal $\overline{OS}$ that is negated relative thereto are supplied by an electronic oscillator G1 whose frequency f0 is synchronized with the frequency f1 by external synchronization. To this end, the frequency f0 of the oscillator G1 here is also selected identical to the modulation frequency f1 and a phase matching between the two signals having the frequencies f0 and f1 is carried out. As in the apparatus of FIG. 1, this occurs with a phase shifter Ph that are supplied with an electrical signal SS via an input EPh, this electrical signal SS agreeing in frequency and phase with the one optical signal LS. After the phase matching, the signals OS and $\overline{OS}$ that are output at the outputs AG and $\overline{AG}$ of the oscillator G1 coincide in frequency and phase with the signal LS.

The other embodiment of the optical mixer of the invention is composed of the electro-optical modulator PMPW shown in FIG. 3 that can replace the directional coupler StRK of the apparatus of FIG. 2.

The electro-optical modulator PMPW of FIG. 3 comprises a polarization modulator PM, for example a crystal that exhibits the electro-optical effect, and of a polarization diplexer pW. The optical signal LS is coupled into the polarization modulator PM as a light signal, polarized in a defined manner. The polarization of the in-coupled light signal LS is variable in the polarization modulator PM dependent on the other signal OS in the form of a voltage U. The light signal LS1 having the influenced polarization and which is coupled out from the polarization modulator PM is conducted to the polarization diplexer PW in which this light signal LS1 is split into two separate, polarized light signal components that are orthogonally polarized relative to one another and of which one can be fed to the one opto-electrical detector PD2 as a mixed signal MS1 and the other can be supplied to the other opto-electrical detector PD2 as a mixed signal MS2.

For example, the polarization modulator PM can be a KDP crystal that modifies the polarization condition of the linearly-polarized signal LS dependent on a voltage U applied to the crystal in the propagation direction r of the signal in the crystal, so that the signal LS1 that is, in turn, coupled out of the crystal is more or less elliptically polarized dependent on the magnitude of the voltage U.

The polarization diplexer PW, for example, can be a Nicols' prism that splits the supplied signal LS1 into a linearly-polarized ordinary light beam and into an extraordinary light beam that is polarized perpendicularly relative thereto in a known manner, these being capable of being used as the mixed signals MS1 and MS2. The other signal OS is thereby to be applied to the crystal PM as a chronologically-varying voltage U.

This other embodiment of the optical mixer can work with freely-propagating light beams.

FIG. 4 illustrates a modification of the apparatus of FIG. 2 in which, differing from the apparatus of FIG. 2, the modulation frequency f1 of the one signal LS and the defined frequency f0 of the other signal OS are different from one another, so that the frequency difference |f1−f0| differs from 0, but whereby the frequency f1 is very large in comparison to the frequency difference.

To that extent to which the apparatus of FIG. 4 coincides with the apparatus of FIG. 2, the same reference characters are used in both figures and the description of the apparatus of FIG. 2 is referenced in this respect.

An insignificant difference of the apparatus of FIG. 4, compared to the apparatus of FIG. 2, is comprised in the above-described circuit of the electrodes EL1–EL4 of the directional coupler StRK. In the directional coupler StRK of FIG. 4, for example, the electrode EL1 of the pair of electrodes EL1, EL2 that is assigned to the one waveguide WL1 is therefore applied to ground, whereas the electrode EL4 that is assigned to the other waveguide WL2 in the other pair of electrodes EL3, EL4 lies at ground. This, for example, is realized such that these two electrodes EL1 and EL4 are connected by electrical lines to the output $\overline{AG}$ of the oscillator G1 that is connected to ground. The electrodes EL2 and EL3 are connected to the output AG of the oscillator G1 for the other signal OS by electrical lines.

Instead of the directional coupler StRK, any other electro-optical modulator could also be used in the apparatus of FIG. 4, this circuit operating correspondingly, for example, as the modulator of FIG. 3.

Due to the different frequency f1 and f0, the mixed signal MS1 and MS2 output at the optical outputs A3 and A4 contain a beat signal of the frequency difference |f1−f0{, so that the electrode signals E11 or, respectively, E21 output by the opto-electrical detectors PD1 and PD2, the amplified signals VE1 or, respectively VE2 and, finally, the output signal AS of the differential amplifier DV also contain a beat signal of this frequency difference {f1−f0{.

The output signal AS having the beat signal that is output by the differential amplifier DV is accepted by a lock-in amplifier LIV1 that is synchronized with a synchronization signal SyS having the frequency difference {f1−f0{, whereby a signal A that is proportional to the amplitude of the intensity fluctuation of the signal LS can be taken at an output AL of the lock-in amplifier LIV1.

An electronic mixer MSt2 is provided for the acquisition of the synchronization signal SyS. One input EM21 of the mixer MSt2 is supplied with the other signal OS having the defined frequency f0 and another input EM22 is supplied with the signal SS that coincides with the optical signal LS in frequency and in phase. The output signal of the mixer MSt2 output at an output AM2 likewise contains a beat signal of the frequency difference f1−f0 and is fed to an input ET1 of a low-pass filter TP1 that suppresses all frequencies in the supply signal that are greater than the frequency difference {f1−f0{ and outputs the synchronization signal SyS at an output AT1, the synchronization signal SyS now contain only the frequency difference {f1−f0{.

Given this apparatus of FIG. 4, also, the time constants $\tau 1 = R1 \cdot C1$ and $\tau 2 = R2 \cdot C2$ must be respectively very large in comparison to $\frac{1}{2} \cdot \pi \cdot f1$. In addition, these time constants $\tau 1$ and $\tau 2$ and/or the frequency difference f1−f0 must be selected such that each time constant $\tau 1$ and $\tau 2$ is smaller than $\frac{1}{2} \cdot \pi \cdot \{f1 - f0\{$.

Given appropriate selection of the frequency difference {f1−f0{, for example in the region around 100 Hz, a great gain in the signal-to-noise ratio is still obtained when the frequency f1 is significantly larger than this frequency difference; the flicker noise, however, is reduced by this measure.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. Apparatus for detecting intensity-modulated light signals comprising:

an electronic mixer stage including
an optical detector device, said optical detector device including an opto-electrical detector for the conversion of light intensity into corresponding electrical signals, and a load resistor connected to said opto-electrical detector;
an optical mixer device including a first input for receiving an intensity-modulated light signal comprising a frequency modulation, a second input for receiving a second signal comprising a frequency defined by the frequency modulation of the intensity-modulated light signal, and an output for outputting a mixed signal formed of the intensity-modulated light signal and the second signal as a light signal, said output of said optical mixer device connected to said optical detector;

the defined frequency of the second signal being different from the modulation frequency of the first signal;

said optical mixer device comprising, in addition to said optical output, a further optical output at which a second mixed signal can be taken, whereby the sum intensity of the mixed signals at any time is equal to the intensity of the first signal at that time multiplied by a constant factor which is less than or equal to 1;

said optical detector means comprises a second opto-electrical detector for the conversion of light intensity into a corresponding electrical signal to which the second mixed signal is fed and, in addition to said load resistor, which is a first load resistor, comprises a second load resistor connected to said second opto-electrical detector;

a differential amplifier connected to said first load resistor and to said second load resistor, whereby said first and second signals are received such that their fluctuations have the same amplitudes; and a lock-in amplifier connected to receive a signal derived from said optical detector device and synchronized by a synchronization signal whose frequency is equal to the difference between the modulation frequency and the defined frequency.

2. The apparatus of claim 1, wherein:
said lock-in-amplifier includes means connected to receive the output signal of said differential amplifier.

3. The apparatus of claim 2, and further comprising:
an electronic mixer stage for generating the synchronization signal and which receives and is operable to mix the second signal having the defined frequency with an electrical further signal corresponding in frequency and phase with the first signal; and a low-pass filter for filtering those frequencies that are higher than the difference between the modulation frequency and the defined frequency from the output signal of said electronic mixer stage, the output signal of said low-pass filter being used as said synchronization signal.

4. The apparatus of claim 3, wherein:
said optical mixer device comprises an electro-optical modulator having an optical input for coupling in said optical first signal and having two outputs for coupling out the first and second mixed signals, said modulator being chargeable with the second signal and modulating a defined light parameter of the first signal coupled into the said modulator according to an amplitude of the second signal.

5. The apparatus of claim 4, wherein:
said electro-optical modulator comprises a controllable, optical directional coupler whose degree of coupling is controlled with the second signal.

6. The improved apparatus of claim 5, wherein said electro-optical modulator comprises:
first and second sections and means for controlling the degree of coupling in said first and second sections by respective second and negated second signals.

7. The apparatus of claim 4, wherein:
said electro-optical modulator comprises a polarization modulator and a polarization diplexer, whereby the polarization of the first signal is coupled in as a polarized light signal and is variable in the polarization modulator dependent on the second signal, and whereby the light signal coupled out of the polarization modulator and having the influenced polarization is fed to the polarization diplexer which splits the signal into two separate signal components that are orthogonally polarized relative to one another, each of these orthogonally-polarized signals being supplied to said opto-electrical detector as a mixed signal.

* * * * *